(12) United States Patent
Otsuka et al.

(10) Patent No.: US 7,315,922 B2
(45) Date of Patent: Jan. 1, 2008

(54) DISK ARRAY APPARATUS, INFORMATION PROCESSING APPARATUS, DATA MANAGEMENT SYSTEM, METHOD FOR ISSUING COMMAND FROM TARGET SIDE TO INITIATOR SIDE, AND COMPUTER PRODUCT

(75) Inventors: Hiroshi Otsuka, Kawasaki (JP); Yasuhiro Onda, Nagoya (JP); Fumio Yamazaki, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 11/065,229

(22) Filed: Feb. 25, 2005

(65) Prior Publication Data

US 2006/0112220 A1    May 25, 2006

(30) Foreign Application Priority Data

Nov. 22, 2004    (JP) .............................. 2004-337915

(51) Int. Cl.
G06F 12/00    (2006.01)
G06F 13/00    (2006.01)
G06F 13/28    (2006.01)

(52) U.S. Cl. ...................... 711/154; 711/100; 711/117
(58) Field of Classification Search ................. 711/117
See application file for complete search history.

(56) References Cited

U.S. PATENT DOCUMENTS

2004/0243737 A1*  12/2004  Beardsley et al. ............. 710/22

2006/0195669 A1*  8/2006  Higaki et al. ................ 711/162

FOREIGN PATENT DOCUMENTS

| JP | 9-167132 | 6/1997 |
|---|---|---|
| JP | 2000-181647 | 6/2000 |
| JP | 2002-182993 | 6/2002 |
| JP | 2004-104254 | 4/2004 |
| JP | 2004-164675 | 6/2004 |
| KR | 100134705 | 1/1998 |

OTHER PUBLICATIONS

Schmidt et al., Google Groups Record, 1997, Google, pp. 1-2.*
Korean Search/Examination Report in corresponding Patent Application No. 039922568 dated Jul. 11, 2006.

* cited by examiner

Primary Examiner—Hyung Sough
Assistant Examiner—Gary W Cygiel
(74) Attorney, Agent, or Firm—Staas & Halsey LLP (57) ABSTRACT

An information processing apparatus transmits, by polling, a status verifying message to a disk array apparatus to verify a status of the disk array apparatus. The disk array apparatus attaches, upon receiving the status verifying message, a request for a command of a process to be executed to a response message to the status verifying message, and transmits the response message to the information processing apparatus. The information processing apparatus creates a command based on the request attached to the response message, and transmits the command created to the disk array apparatus.

18 Claims, 7 Drawing Sheets

DISK ARRAY APPARATUS, INFORMATION PROCESSING APPARATUS, DATA MANAGEMENT SYSTEM, METHOD FOR ISSUING COMMAND FROM TARGET SIDE TO INITIATOR SIDE, AND COMPUTER PRODUCT

BACKGROUND OF THE INVENTION

1) Field of the Invention

The present invention relates to a method for issuing a command from a target side to an initiator side between a disk array apparatus having a target function only and an information processing apparatus having an initiator function only, a disk array apparatus and an information processing apparatus to which the method is applied, and a data management system including a disk array apparatus having a target function only and an information processing apparatus having an initiator function only to which the method is applied.

2) Description of the Related Art

Figure 9:
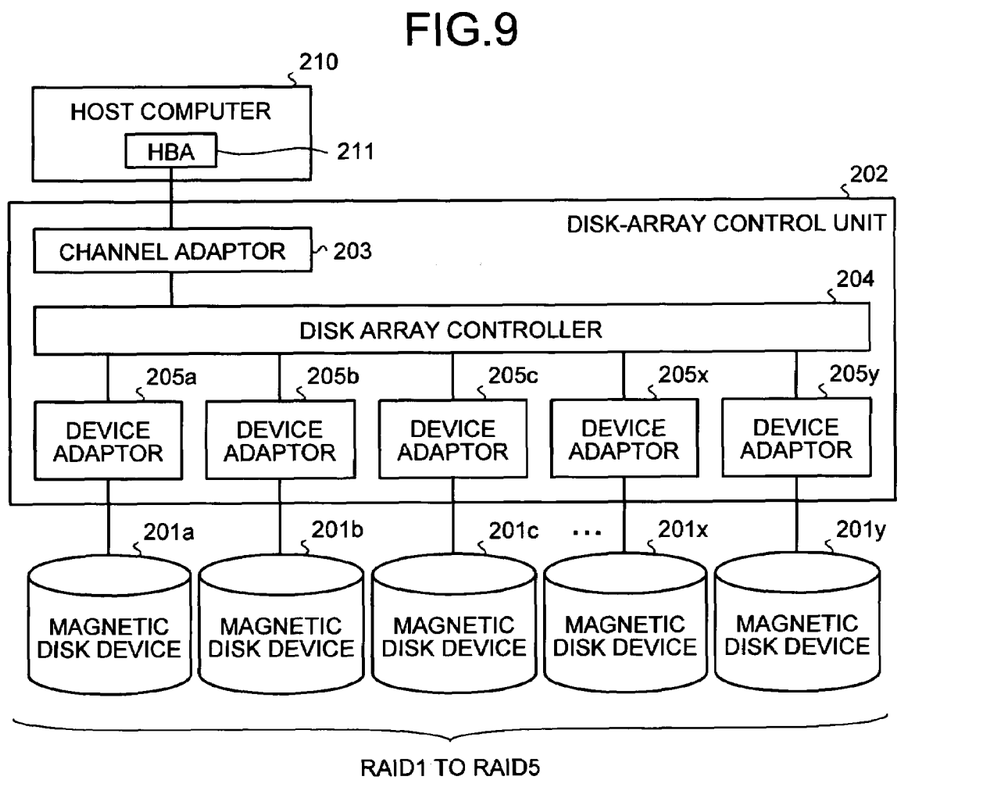
FIG. 9 is a block diagram of a conventional disk array apparatus.

A conventional disk array apparatus (redundant arrays of inexpensive disks: RAID) can access data massively stored in an external storage unit connected to a host computer in a high speed, with an improved reliability by providing a redundancy of the data at the time of an error occurrence (see, for example, Japanese Patent Application Raid-Open Publication No. 2004-164675). In general, the disk array apparatuses are classified into five levels, RAID1 to RAID5, according to speed of accessing data and level of the redundancy. FIG. 9 is a block diagram of the conventional disk array apparatus. The disk array apparatus includes a plurality of magnetic disk devices $201a$, $201b$, $201c$, ..., $201x$, and $201y$, which are constituted with hard disk devices, and a disk-array control unit 202 that performs a control of the magnetic disk devices $201a$ to $201y$.

Each of the magnetic disk devices $201a$ to $201y$ is used for different purposes corresponding to the level of the RAID. The purposes can be storing of data, mirroring the data stored in the magnetic disk device, storing parity data created for data stored in a magnetic disk device, etc. The disk-array control unit 202 includes a channel adapter 203 that is connected to a host bus adapter (HBA in FIG. 9) 211 of a host computer 210, and performs an interface control for the host computer 210, a disk array controller 204 is connected to the magnetic disk devices $201a$ to $201y$, and performs a variety of controls when reading and writing data, and device adapters $205a$, $205b$, $205c$, ..., $205x$, and $205y$ that perform a control of each of the magnetic disk devices $201a$ to $201y$ based on an instruction from the disk array controller 204 when reading and writing data.

The channel adapter 203 and the host bus adapter 211 are, for example, American National Standard Institute (ANSI)-standard small computer system interface (SCSI) devices, and some of them include a SCSI device (the host bus adapter 211) of the host computer 210 having a function of issuing a command (hereinafter, "an initiator function") only and a SCSI device (the channel adapter 203) of the disk array apparatus having a function of receiving and executing a command (hereinafter, "a target function") only. In this type of disk array apparatus, the host computer 210 having a SCSI device with the initiator function only performs a communication with a disk array apparatus having a SCSI device with the target function only, based on a SCSI standard, to perform a bidirectional data communication. For example, when the channel adapter 203 receives a read command from the host bus adapter 211, the disk array apparatus only performs a read process with the magnetic disk devices $201a$ to $201y$ via the device adapters $205a$ to $205y$, and returns a result of the read process to the host bus adapter 211 (see, for example, Japanese Patent Application Laid-Open Publication No. H9-167132). In this case, only when the host computer having the initiator function only issued a command, the disk array apparatus having the target function only can perform only a response to the command.

However, these days, the storage units to be connected to the host computers are increasingly required to have larger capacity and higher access speed. Data management systems that fulfill such a demand are known. Such a data management system includes a hierarchy management unit that performs a hierarchy management for a disk array apparatus, a large-capacity storage unit such as an optical disk, data to be stored in the disk array apparatus, and data to be stored in the large-capacity storage unit. This type of data management system makes an access from a host computer to data smooth by performing a hierarchy management in which, for example, frequently used data from among the data stored in the large-capacity storage unit is disposed in the disk array apparatus. In this type of data management system, a bidirectional communication for transmitting and receiving a command is performed between the disk array apparatus and the hierarchy management unit, because a process such as deleting or writing of data is necessary.

However, it is the reality that disk array apparatuses having the target function only are widely used so far. With this type of disk array apparatus, it is not possible for the disk array apparatus to transmit a message to a host computer having the initiator function or a hierarchy management unit in a data management system. For this reason, the conventional disk array apparatus having the target function only cannot be used in the data management system in which a bidirectional data communication is frequently carried out between the disk array apparatus and the hierarchy management unit. Therefore, it is necessary to use a disk array apparatus including a channel adapter, a host computer, and a hierarchy management unit having both the initiator function and the target function. In other words, device adapters must be changed such that both the channel adapter of the disk array apparatus and a host bus adapter of the hierarchy management unit or the host computer have both the initiator function and the target function.

SUMMARY OF THE INVENTION

It is an object of the present invention to at least solve the problems in the conventional technology.

According to one aspect of the present invention, a method of issuing a command from a target to an initiator in a system that includes an information processing apparatus that has a host bus adapter with only an initiator function to issue the command, and a disk array apparatus that has a channel adapter with only a target function to receive and execute the command, the information processing apparatus and the disk array apparatus being connected via a communication line includes polling including the information processing apparatus transmitting a status verifying message to the disk array apparatus to verify a status of the disk array apparatus; preparing including the disk array apparatus preparing, upon receiving the status verifying message, a response message by attaching a request for a command of a process to be executed to the status verifying message; transmitting including the disk array apparatus transmitting the response message to the information processing apparatus; and creating including the information processing apparatus creating a command based on the request attached to the response message; and transmitting including the information processing apparatus transmitting the command created to the disk array apparatus.

According to another aspect of the present invention, a disk array apparatus that is connected to an information processing apparatus including a host bus adapter with only an initiator function to issue a command, and includes a channel adapter with only a target function to receive and execute the command includes a creating unit that creates, when a process to be executed occurs, a request to execute the process; and a processing unit that prepares a response message by attaching the request created to a response message to a status verifying message transmitted by polling from the information processing apparatus, and transmits the response message to the information processing apparatus.

According to still another aspect of the present invention, an information processing apparatus that is connected to a disk array apparatus including a channel adapter with only a target function to receive and execute a command, and includes a host bus adapter with only an initiator function to issue the command to the disk array apparatus includes a polling unit that transmits a status verifying message to verify a status of the disk array apparatus to the disk array apparatus; a processing unit that creates, when a request to be executed by the disk array apparatus is attached to a response message from the disk array apparatus to the status verifying message, a command corresponding to the request; and a transmitting unit that transmits the command created to the disk array apparatus.

According to still another aspect of the present invention, a data management system includes a primary storage unit including a disk array unit formed with a plurality of magnetic disk devices, a disk-array control unit that controls the disk array unit, and a channel adapter having only a target function to receive and execute a command, the primary storage unit being connected to a host computer, wherein the primary storage unit further includes a creating unit that creates, when a process to be executed occurs, a request to execute the process; and a first processing unit that prepares a response message by attaching the request created to a response message to a status verifying message transmitted from a hierarchy management server and transmits the response message to the hierarchy management server; a secondary storage unit having a larger capacity than the primary storage unit; and the hierarchy management server that includes a host bus adapter having only an initiator function to issue a command, and performs a hierarchy management of data by storing specific data selected, based on a predetermined standard, from among data stored in the secondary storage unit, the hierarchy management server being connected to the primary storage unit and the secondary storage unit, wherein the hierarchy management server further includes a polling unit that transmits the status verifying message to verify a status of the primary storage unit to the primary storage unit; a second processing unit that creates, when a request is attached to the response message, a command corresponding to the request; and a transmitting unit that transmits the command created to the primary storage unit.

According to still another aspect of the present invention, a computer-readable recording medium that stores therein a computer program for issuing a command in a channel adapter of a disk array apparatus that includes only a target function to receive and execute the command, the disk array apparatus being connected to an information processing apparatus including a host bus adapter having only an initiator function to issue the command, the computer program causing the channel adapter to execute creating, when a process to be executed occurs, a request to execute the process; and preparing a response message by attaching the request created to a status verifying message that is transmitted by polling from the information processing apparatus; and transmitting the response message created to the information processing apparatus.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained in detail below with reference to the accompanying drawings.

Figure 1:
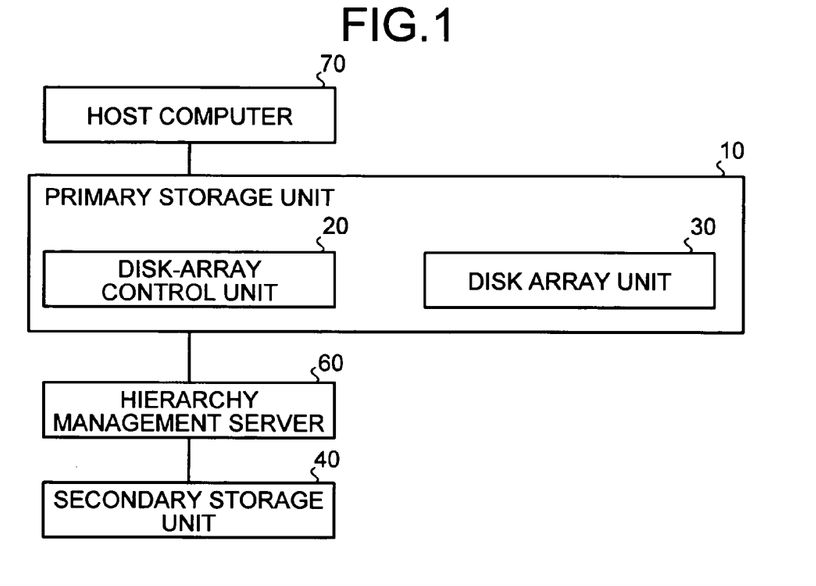
FIG. 1 is a block diagram of a data management system according to an embodiment of the present invention.

FIG. 1 is a block diagram of a data management system according to an embodiment of the present invention. The data management system includes a primary storage unit 10, a hierarchy management server 60, and a secondary storage unit 40. These units are connected to each other via a communication line, which can be a fiber channel (FCC) or a SCSI cable. The secondary storage unit 40 has a larger capacity than the primary storage unit 10 and stores data that is to be stored in the primary storage unit 10. The hierarchy management server 60 manages data on the secondary storage unit 40. The hierarchy management server 60 and the secondary storage unit 40 can be provided in plurality.

The data management system is connected to a host computer 70, and the data management system is used as an external storage unit of the host computer 70. The host computer 70 is an information processing terminal, such as a personal computer and a server, which can be, for example, a client terminal connected to a network, an experimental-data management server arranged in the network, or a data management server, such as a text-data management server and an image-data management server. According to an embodiment of the present invention, the host computer 70 has a function, when performing an access to the data management system as the external storage unit for reading and writing data, that repeatedly performs the access until a desired goal is achieved. The host computer 70 corresponds to an information processing apparatus and a host computer in the claims.

The secondary storage unit 40 stores data, such as experimental data, text data, and image data of still and/or moving images, formed with a recording-medium reproducing unit that stores and reproduces a recording medium, such as a tape, an optical disk, and an optical-magnetic disk. Regarding to the storage capacity of the secondary storage unit 40, for example, if the primary storage unit 10 has a capacity on the order of a terabyte ($10^{12}$), it is preferable that the secondary storage unit 40 has a capacity on the order of a petabyte ($10^{15}$). In other words, the secondary storage unit 40 has considerably larger capacity than the primary storage unit 10. In the secondary storage unit 40, data is managed based on a logical block address (LBA) that is added for identifying each of physical sectors and a logical unit number (LUN) that is added to an aggregate of continuous logical blocks.

Figure 2:
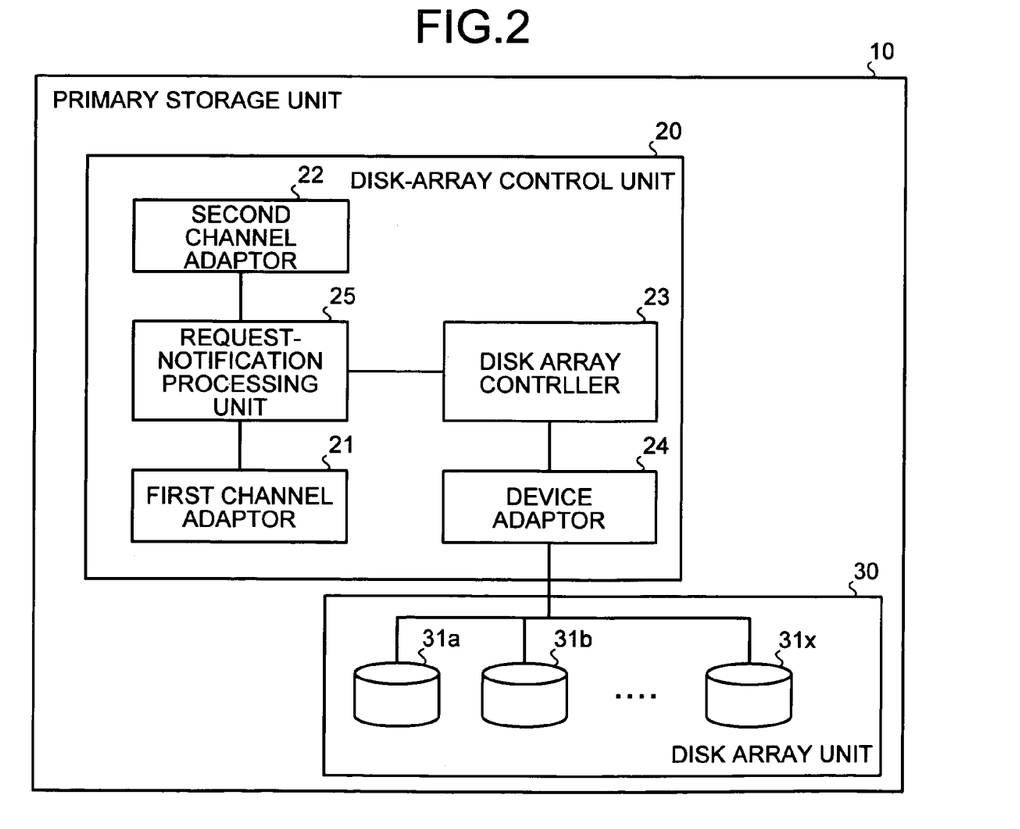
FIG. 2 is a detailed block diagram of a primary storage unit shown in FIG. 1.

The primary storage unit 10 includes a disk array unit 30 that stores data, and a disk-array control unit 20 that controls the disk array unit 30. FIG. 2 is a block diagram of the primary storage unit 10. The disk array unit 30 includes a plurality of magnetic disk devices (hard disk devices) 31a, 31b, . . . , 31x, such as a magnetic disk device having a function to store data, magnetic disk device having a function for mirroring the data, and a magnetic disk device having a function to store parity data for the data stored, although the configuration depends on a level of the RAID, as described above. The data stored in the disk array unit 30 is data accessed by the host computer 70 from among the data stored in the second storage unit 40. The primary storage unit 10 corresponds to a disk array apparatus and a primary storage unit in the claims.

The disk-array control unit 20 includes a first channel adapter 21 that performs an interface control with respect to the hierarchy management server 60, a second channel adapter 22 that performs an interface control with respect to the host computer 70, a disk array controller 23 that controls the disk array unit 30, a device adapter 24 that controls each of the magnetic disk devices 31a to 31x that constitutes the disk array unit 30, and a request-notification processing unit 25 that performs a processing such that a command to process in the primary storage unit 10 is executed.

The first channel adapter 21 and the second channel adapter 22 are adapters having only a target function to receive and execute a command, and perform a control of receiving commands issued by the hierarchy management server 60 and the host computer 70, respectively, and transmitting the commands to the request-notification processing unit 25. At the same time, the first channel adapter 21 and the second channel adapter 22 have a function of transmitting a response created by each processing unit of the disk-array control unit 20 with respect to a command from an external device (such as the hierarchy management server 60 and the host computer 70) to the external device. The disk array controller 23 has a function of performing a variety of controls or a process when the command transmitted via the first channel adapter 21 and the second channel adapter 22 is a read/write command or other predetermined command.

The device adapter 24 has a function of controlling the magnetic disk devices 31a to 31x based on an instruction from the disk array controller 23. The disk array controller 23 and the device adapter 24 have same functions as a disk array control unit and a device adapter that control a conventional disk array apparatus.

Figure 3:
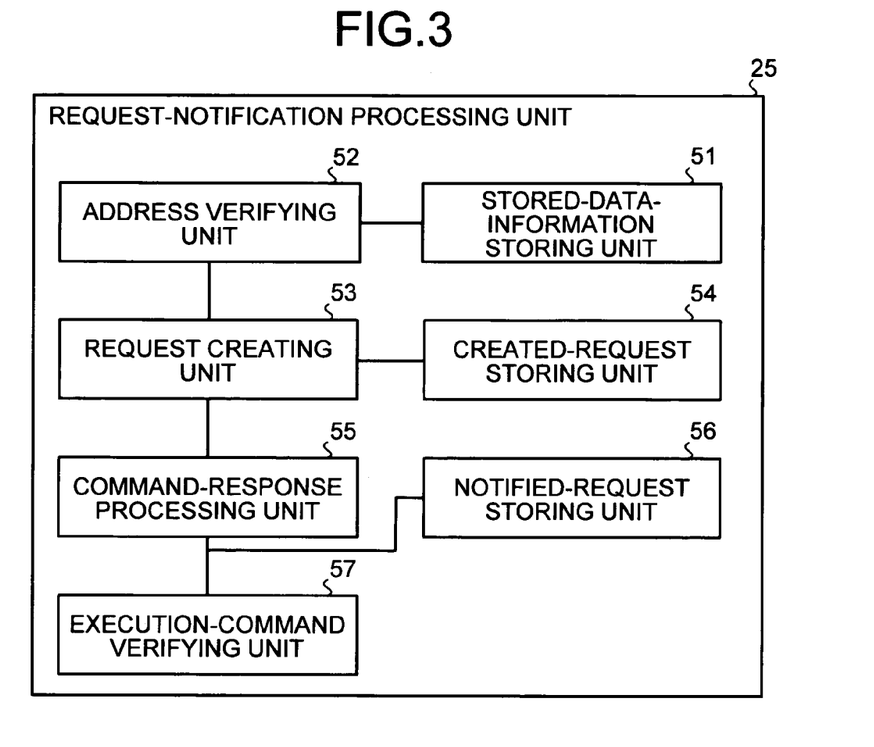
FIG. 3 is a functional block diagram of a request-notification processing unit shown in FIG. 2.

FIG. 3 is a functional block diagram of the request-notification processing unit 25. The request-notification processing unit 25 includes a stored-data-information storing unit 51, an address verifying unit 52, a request creating unit 53, a created-request storing unit 54, a command-response processing unit 55, a notified-request storing unit 56, and an executed-command verifying unit 57.

The stored-data-information storing unit 51 stores stored-data information indicating logical area and address that is a storing location, in the secondary storage unit 40, of data stored in the disk array unit 30 of the primary storage unit 10. Because in the secondary storage unit 40, data is managed based on a logical unit number and a logical block address, the stored-data information includes a logical unit number and a logical block address indicating a storing location in the secondary storage unit 40 for data stored in the disk array unit 30.

The address verifying unit 52 has a function of determining whether data accessed by a command transmitted from the hierarchy management server 60 or the host computer 70 via the first channel adapter 21 or the second channel adapter 22 is the data stored in the disk array unit 30 of the primary storage unit 10, based on the stored-data information stored in the stored-data-information storing unit 51. In other words, the address verifying unit 52 determines whether a logical unit number and a logical unit address of an access destination included in the command is included in the stored-data information in the stored-data-information storing unit 51. When a result of determination is that the data to be accessed is stored in the disk array unit 30, the command is passed over to the disk array controller 23, and a normal command process is execute by the disk array controller 23. On the other hand, when the data to be accessed is not stored in the disk array unit 30, the command is passed over to the disk array controller 23, and at the same time, the result of determination is output to the request creating unit 53.

The request creating unit 53 has a function of creating a command required by the primary storage unit 10 as a request, and storing the request created in the created-request storing unit 54. The command required by the primary storage unit 10 can be a command required by the primary storage unit 10 itself, and a command required by a process with respect to an input from the hierarchy management server 60 or the host computer 70. In the former case, although it is necessary to acquire system configuration information for the primary storage unit 10 to function as the primary storage unit 10 of the data management system at a time of starting up, it is possible to provide a command for acquiring the information. In the latter case, for example, when the result of determination by the address verifying unit 52 is that the data required by the host computer 70 is not stored in the primary storage unit 10, it is possible to provide a command for copying information corresponding to the data from the secondary storage unit 40 to the primary storage unit 10.

The created-request storing unit 54 has a function of storing the request created by the request creating unit 53. It is desirable to store the request in order of creation.

The command-response processing unit 55 has a function of responding to a status verifying message to verify a status of the primary storage unit 10 (whether the primary storage unit 10 includes a request) to which polling is conducted from the hierarchy management server 60. When the request is stored in the created-request storing unit 54, the request is attached to a response message to the status verifying message, and transmitted to the hierarchy management server 60. On the other hand, when the request is not stored in the created-request storing unit 54, upon receiving the status verifying message, the command-response processing unit 55 enters a standby status for a predetermined period of time that is shorter than a time from receiving the status verifying message until detecting a time out set in the hierarchy management server 60. During the predetermined period of time, the command-response processing unit 55 monitors whether a request is stored in the created-request storing unit 54. When a request is stored in the created-request storing unit 54 within the predetermined period of time, the request is attached to the response message, and immediately transmitted to the hierarchy management server 60. When a request is not stored in the created-request storing unit 54 within the predetermined period of time, after the predetermined period of time has passed, a normal response message is transmitted. The number of requests attached to the response message is not limited to a specific number, which means that a plurality of requests can be attached. The request attached to the response message is deleted from the created-request storing unit 54, and at the same time, stored in the notified-request storing unit 56.

With this mechanism, when a request is stored in the created-request storing unit 54, because a response message with a request attached is returned immediately after receiving a status verifying message, a corresponding request required by the primary storage unit 10 is executed at once by the hierarchy management server 60. Furthermore, when a request is not stored in the created-request storing unit 54, because a response message is returned after waiting a predetermined period of time that is slightly shorter than a time determined as a time out by the hierarchy management server 60, and when a request is stored in the created-request storing unit 54 within the wait time until the response message is returned, a response message with the request attached is immediately returned, it is possible to transmit a request created to the hierarchy management server 60 in substantially real time.

The notified-request storing unit 56 has a function of storing notified-request information that is a content of the request, in the created-request storing unit 54, attached to the response message. In other words, the request transmitted to the hierarchy management server 60 is stored in the notified-request storing unit 56.

The executed-command verifying unit 57 has a function of monitoring the notified-request information stored in the notified-request storing unit 56, whether the request attached to the response message is executed by the hierarchy management server 60. The executed-command verifying unit 57 checks a command obtained via the first channel adapter 21, and when the request is included in the notified-request information, deletes a corresponding request from the notified-request information stored in the notified-request storing unit 56.

Figure 4:
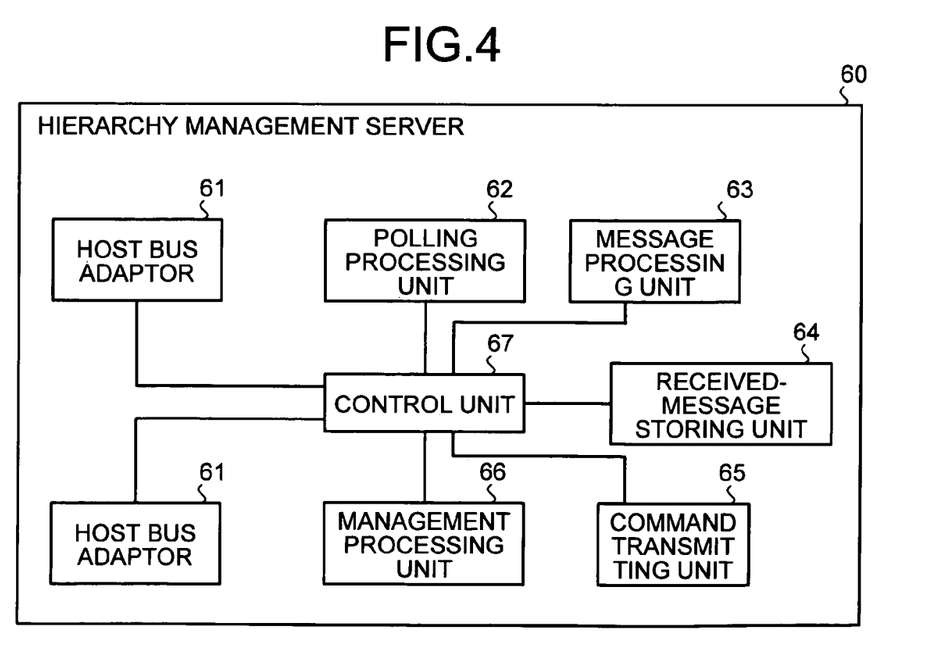
FIG. 4 is a block diagram of a hierarchy management server shown in FIG. 1.

The hierarchy management server 60 is a server having a hierarchy management function of selecting data to be stored in the primary storage unit 10 from among the data stored in the secondary storage unit 40, storing the data selected in the primary storage unit 10, and deleting data stored in the primary storage unit 10 when storing the data. FIG. 4 is a block diagram of the hierarchy management server 60. The hierarchy management server 60 includes a host bus adapter 61 that performs an interface control with respect to the primary storage unit 10, a polling processing unit 62 that performs polling of a status verifying message to verify a status of the primary storage unit 10, a message processing unit 63 that processes a response message from the primary storage unit 10 with respect to the polling, a received-message storing unit 64 that stores a command requested, a command transmitting unit 65 that transmits a read/write command or a command requested to the primary storage unit 10, a management processing unit 66 that performs other process necessary for performing a hierarchy management of data in the hierarchy management server 60, the primary storage unit 10, and the secondary storage unit 40, and a control unit 67 that controls each of the processing units. The hierarchy management server 60 corresponds to an information processing apparatus and a hierarchy management server in the claims.

The host bus adapter 61 is an adapter having only an initiator function to issue a command, including a function to transmit a status verifying message issued by the polling processing unit 62 or a command to control the primary storage unit 10 issued by the command transmitting unit 65. The hierarchy management server 60 includes two host bus adapters 61 because it is connected to both the primary storage unit 10 and the secondary storage unit 40.

The polling processing unit 62 has a function to issue a status verifying message to verify a status of the primary storage unit 10, i.e., whether the primary storage unit 10 holds a message (request) to the hierarchy management server 60 having only an initiator function. Once a status verifying message is transmitted to the primary storage unit 10, a next status verifying message is transmitted immediately after a response message is received from the primary storage unit 10. However, according to the present embodiment, when there is no request in the primary storage unit 10, the response message is transmitted after waiting a predetermined period of time that is shorter than a time for the hierarchy management server 60 to detect a time out, thereby enabling to suppress a load on the hierarchy management server 60.

The message processing unit 63 has a function to manage a process performed by the hierarchy management server 60 according to a response to a status verifying message transmitted from the polling processing unit 62 to the primary storage unit 10. When there is no response message received with respect to a status verifying message even after a predetermined period of time has passed since the status verifying message is transmitted from the polling processing unit 62 to the primary storage unit 10, it is determined that a kind of error has occurred in the primary storage unit 10 as a time out. Besides, when there is a response message received within the predetermined period of time, the message processing unit 63 determines whether a request is attached to the response message. When a request is attached to the response message, the message processing unit 63 creates a command corresponding to the response message, and stores the command created in the received-message storing unit 64. On the other hand, when no request is attached to the response message, the message processing unit 63 performs no process.

The received-message storing unit 64 stores a command created based on a request attached to the response message from the primary storage unit 10 with respect to the status verifying message transmitted from the polling processing unit 62. Namely, a command to be executed by the primary storage unit 10 is stored in the received-message storing unit 64. It is also desirable to store the command in the received-message storing unit 64 sequentially in the order that the command is received.

The command transmitting unit 65 has a function to issue a command for executing a process to read/write data with respect to the primary storage unit 10. When a command is stored in the received-message storing unit 64, the command transmitting unit 65 issues the command stored. In this case, it is desirable to issue the command in the order that the command is stored in the received-message storing unit 64 (i.e., from the command stored earlier), too.

The management processing unit 66 has a function to perform a process that is not directly related to the present embodiment, which is performed by the hierarchy management server 60, such as a management of the secondary storage unit 40.

With the above configuration of the data management system, even in a system in which the primary storage unit including the channel adapters 21, 22 having only a target function and the hierarchy management server 60 including a host bus adapter 61 having only an initiator function are connected, it is possible to execute a command that is to be executed by the primary storage unit 10.

Following is an explanation for (1) an execution processing of a command by the data management system, (2) a polling process by the hierarchy management server 60, (3) a process of creating a request by the primary storage unit 10, and (4) a process of issuing a command by the data management system.

Figure 5:
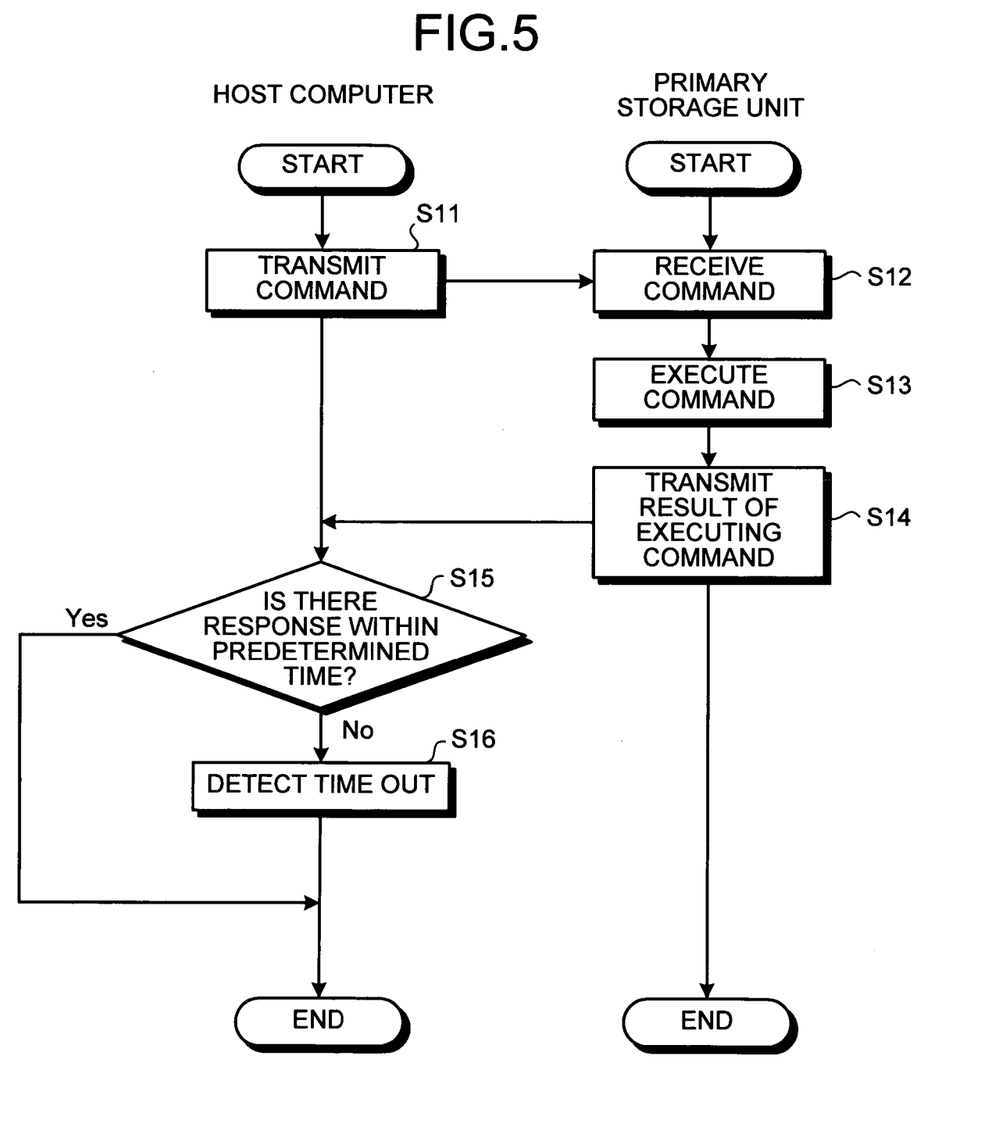
FIG. 5 is a flowchart for explaining an example of a process of executing a command.

FIG. 5 is a flowchart for explaining an example of a process of executing a command by the data management system. The host computer 70 transmits a command, such as a read command and a write command, according to a request from a user, for data stored in an external storage unit (step S11). The command is received at the primary storage unit 10 via the second channel adapter 22 (step S12). The address verifying unit 52 of the disk-array control unit 20 of the primary storage unit 10 determines whether an access destination included in the command received is data stored in the disk array unit 30 based on a logical unit number and a logical block address, and delivers the command to the disk array controller 23. The disk array controller 23 executes the command delivered (step S13). The disk array controller 23 transmits a result of executing the command to the host computer 70 via the second channel adapter 22 (step S14). Then, a process on a side of the primary storage unit 10 is completed.

The host computer 70 determines whether there is a response from the primary storage unit 10 within a predetermined period of time since transmitting the command (step S15). When there is a response within the predetermined period of time ("YES" at step S15), the host computer 70 acquires a result of executing the command, and finishes a process for the command transmitted. On the other hand, when there is no response within the predetermined period of time ("NO" at step S15), the host computer 70 detects a time out (step S16), and finishes a process for the command transmitted. Furthermore, a process after detecting the time out can be set arbitrarily, and the command issued at the Step S11 can be transmitted to the primary storage unit 10 again.

Figure 6:
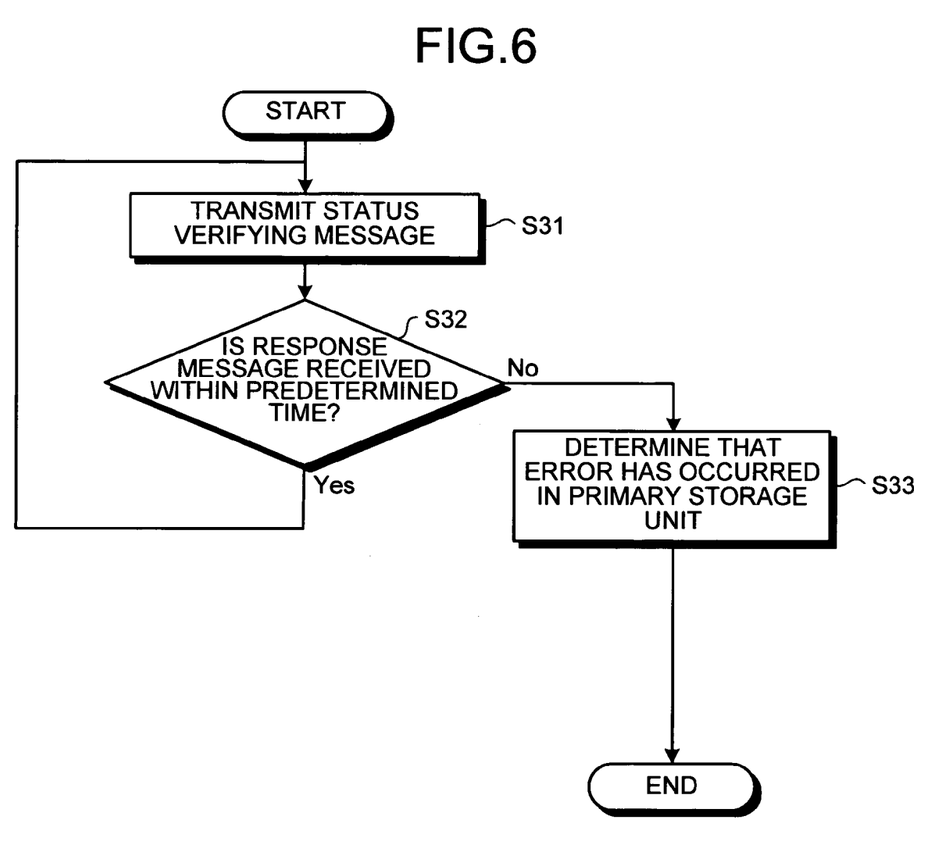
FIG. 6 is a flowchart for explaining an example of a process of polling.

FIG. 6 is a flowchart for explaining an example of a process of polling by the hierarchy management server 60. Here, the explanation is only for a polling process by the hierarchy management server 60, and a command issuing process possibly occurring from the polling process is explained later. First of all, the polling processing unit 62 of the hierarchy management server 60 transmits a status verifying message to verify a status of the primary storage unit 10 via the host bus adapter 61 (step S31). The command-response processing unit 55 of the request-notification processing unit 25 of the disk-array control unit 20 of the primary storage unit 10 creates a response message to the status verifying message received, and transmits the response message created to the hierarchy management server 60. When an error has occurred in the primary storage unit 10, it is not possible to transmit the response message to the status verifying message, the hierarchy management server 60 experiences that a status of no response to the status verifying message is continued.

The message processing unit 63 of the hierarchy management server 60 determines whether a response message is received from the primary storage unit 10 within a reference time to determine that a kind of error has occurred in the primary storage unit 10 (step S32). When there is no response message within the reference time ("NO" at step S32), i.e., when a time out is detected, the message processing unit 63 determines that a kind of error has occurred in the primary storage unit 10 (step S33), and performs a necessary process, such as notifying an occurrence of an error to a manager of the data management system. Then, the polling process is completed.

On the other hand, when a response is received within the reference time ("YES" at step S32), the sequence is returned to the Step S31, and the polling processing unit 62 repeats the above process to execute a process to acquire a status of the primary storage unit 10. In other words, a next status verifying message is transmitted immediately after receiving a response message. At this moment, the hierarchy management server 60 starts a background process for a request attached to the response message. In this mechanism, the polling processing unit 62 transmits a status verifying message immediately after receiving a response message from the primary storage unit 10, which is returned after waiting a predetermined time that is slightly shorter than a time to detect a time out, thereby suppressing a load on the hierarchy management server 60.

Figure 7:
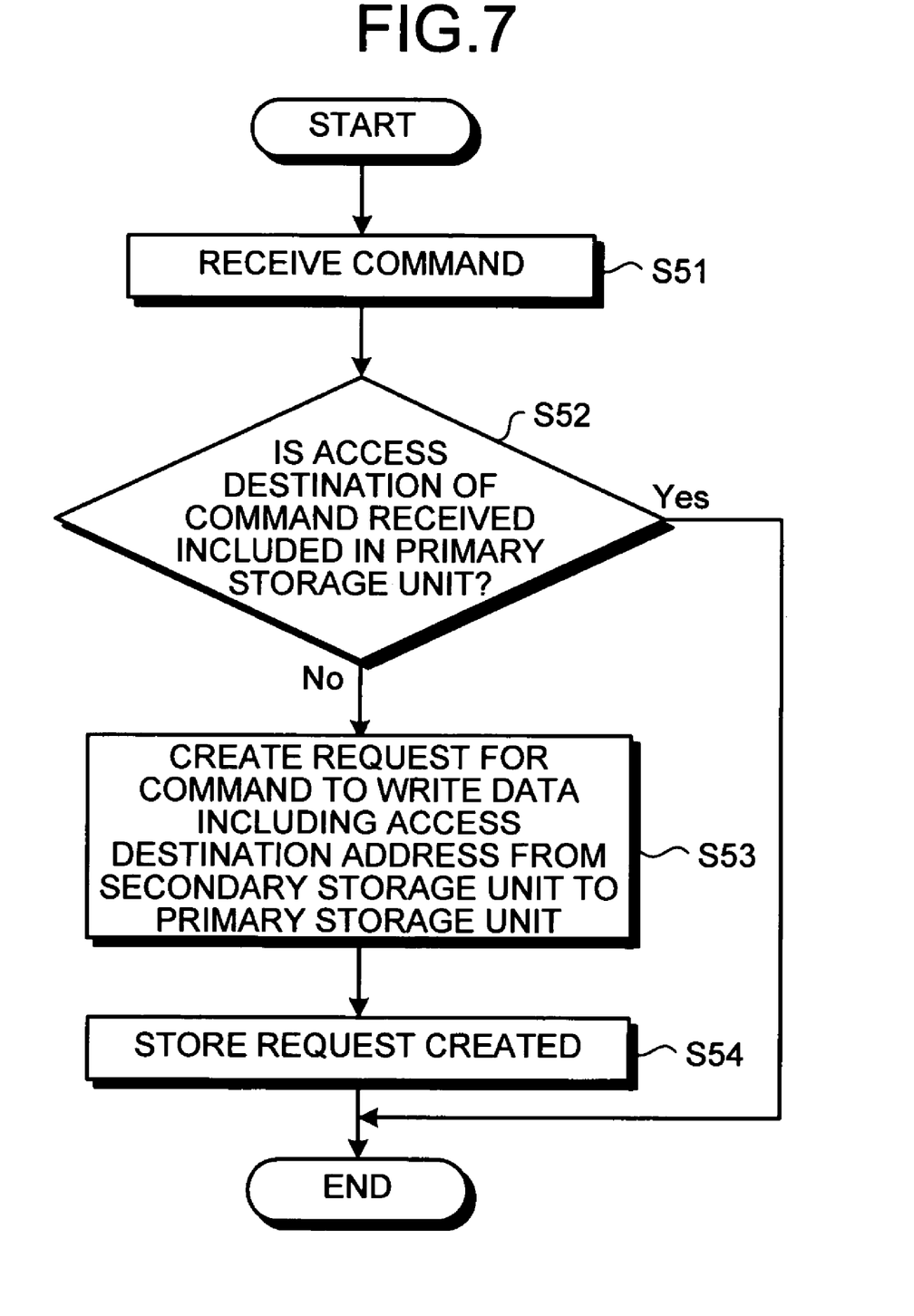
FIG. 7 is a flowchart for explaining an example of a process of creating a request.

FIG. 7 is a flowchart for explaining an example of a process of creating a request by the primary storage unit 10. Here, the explanation is given only for a request creating process occurred when a command is received. First of all, when a command, such as a read command and a write command for performing an access to read or write data with respect to the data management system, is issued from the host computer 70, the second channel adapter 22 of the disk-array control unit 20 of the primary storage unit 10 receives the command (step S51), and delivers the command received to the request-notification processing unit 25.

The address verifying unit 52 of the request-notification processing unit 25 determines whether an access destination of the command received is included in the primary storage unit 10, by comparing with stored-data information stored in the stored-data-information storing unit 51 (step S52). In other words, the address verifying unit 52 determines whether a logical unit number and a logical block address indicating an access destination address is stored in the disk array unit 30 of the primary storage unit 10, using the stored-data information. When the access destination address of the command is not stored in the primary storage unit 10 ("NO" at step S52), the request creating unit 53 creates a request for a command to write data including the access destination address for the command received from the secondary storage unit 40 to the primary storage unit 10 (step S53), and stores the command created in the created-request storing unit 54 (step S54). Then, a process to create a request by the primary storage unit 10 is completed. The request includes, for example, when a free space is not sufficient in a disk capacity of the primary storage unit 10, a command to delete least-recently used data from among the data stored in the primary storage unit 10, and a command to write new data extracted from the secondary storage unit 40 including the access destination address into a location of the data deleted. Thereafter, the command is transmitted to the disk array controller 23.

On the other hand, when the access destination address of the command is stored in the primary storage unit 10 ("YES" at step S52), the request-notification processing unit 25 delivers the command received to the disk array controller 23, and finishes the process to create a command, because there is no request to create. Then, as shown in FIG. 5, the disk array controller 23 performs a process to access data designated by the host computer 70 from the disk array unit 30, based on the access destination address included in the command, and returns a result of the process to the host computer 70.

A case in which a request is created according to a content of a command received from the host computer 70 is explained in FIG. 7. However, creation of a request by the primary storage unit 10 is not limited in this case. For example, a request is also created when a command is received from the hierarchy management server 60. Furthermore, in a case in which a command to acquire configuration information of the data management system is requested when it is necessary for the disk-array control unit 20 to autonomously acquire the configuration information at a time of starting the data management system, the request creating unit 53 also creates the request.

Figure 8:
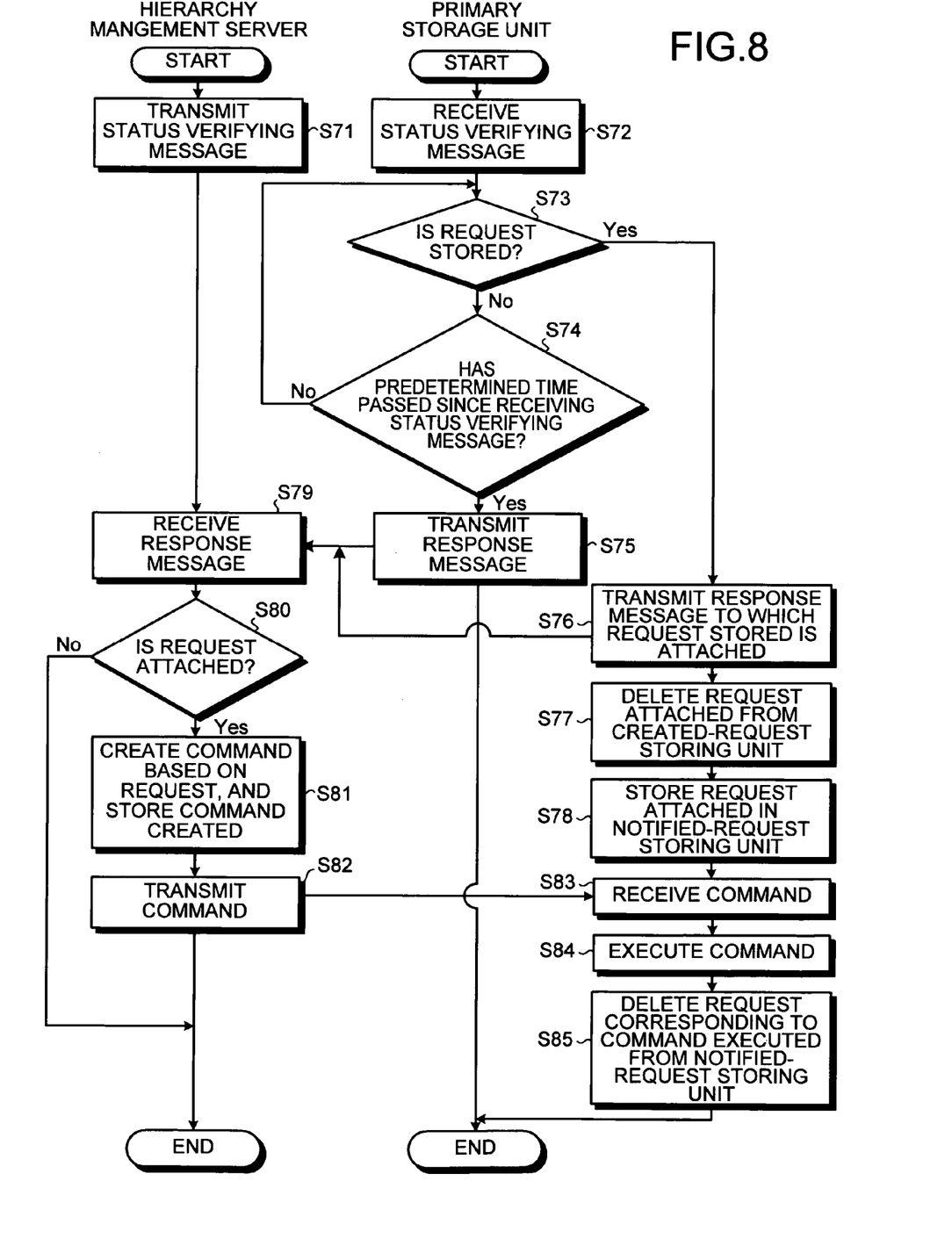
FIG. 8 is a flowchart for explaining an example of a procedure of issuing a command in the data management system.

FIG. 8 is a flowchart for explaining an example of a procedure of issuing a command from the primary storage unit 10 to the hierarchy management server 60. First of all, the polling processing unit 62 of the hierarchy management server 60 transmits the status verifying message to the primary storage unit 10 via the host bus adapter 61 (step 71). When the first channel adapter 21 of the disk-array control unit 20 of the primary storage unit 10 receives the status verifying message from the hierarchy management server 60 (step 72), delivers the status verifying message received to the command-response processing unit 55. The command-response processing unit 55 determines whether a request is stored in the created-request storing unit 54 (step 73).

When a request is not stored in the created-request storing unit 54 ("NO" at step 73), the command-response processing unit 55 further determines whether a predetermined period of time has passed since receiving the status verifying message (step 74), and when the predetermined period of time has not passed ("NO" at step 74), returns to the Step S73. The predetermined period of time is set to a time shorter than a reference time to determine that a kind of error has occurred in the primary storage unit 10 by the hierarchy management server 60. On the other hand, when the predetermined period of time has passed since receiving the status verifying message ("YES" at step 74), the command-response processing unit 55 transmits a response message to the status verifying message to the hierarchy management server 60 via the first channel adapter 21 (step 75), and a process of issuing a command when the request from the primary storage unit 10 is not stored is completed.

When a request is stored in the created-request storing unit 54 at the Step 73 ("YES" at step 73), the command-response processing unit 55 attaches the request stored in the created-request storing unit 54 to the response message to the status verifying message, and immediately transmits the response message to the hierarchy management server 60 via the first channel adapter 21 (step 76). At the same time, the command-response processing unit 55 deletes the request attached to the response message from the created-request storing unit 54 (step 77), and stores the request in the notified-request storing unit 56 (step 78).

The hierarchy management server 60 receives the response message via the host bus adapter 61 (step 79), and delivers the response message received to the message processing unit 63. The message processing unit 63 determines whether a request is attached to the response message (step 80).

When a request is attached to the response message ("YES" at step 80), the message processing unit 63 creates a command based on the request attached, and stores the command created in the received-message storing unit 64 (step 81). The command transmitting unit 65 transmits the command stored in the received-message storing unit 64 to the primary storage unit 10 via the host bus adapter 61 (step 82), and a process of issuing a command in the hierarchy management server 60 when a request is attached is completed.

The primary storage unit 10 receives the command (step 83), and delivers the command to the disk array controller 23 to execute the command (step 84). The executed-command verifying unit 57 of the request-notification processing unit 25 of the disk-array control unit 20 monitors the command executed by the disk array controller 23. When the command executed is corresponding to a content of a request stored in the notified-request storing unit 56, the executed-command verifying unit 57 deletes the corresponding request from the notified-request storing unit 56 (step 85), and a process of issuing a command by the primary storage unit 10 when a request is stored is completed. The command executed at Steps S81 to S85 is executed in a background of the polling process shown in FIG. 6.

When a request is not attached to the response message at the Step S80 in the hierarchy management server 60 ("NO" at step 80), the message processing unit 63 recognizes that the primary storage unit 10 is in a normal state with no process to request, and finishes a process of issuing a command in the hierarchy management server 60 when a request is not attached.

The above method of issuing a command from a target side to an initiator side can be implemented by storing a computer program including a process procedure for the method in a computer-readable recording medium, and reading and executing the computer program by an operation processing unit having a function of processing the computer program in a disk array apparatus. The computer-readable recording medium includes, for example, a portable recording medium, such as a flexible disk, a compact disk-read only memory (CD-ROM), an optical-magnetic disk, a digital versatile disk (DVD), and an integrated-circuit (IC) card, and a fixed recording medium, such as an internal hard disk drive or an external hard disk drive of a computer, a random access memory (RAM), and a read only memory. Further, a communication medium temporarily stores the computer program when transmitting the computer program, such as a public line connected via a modem, and local area network (LAN)/wide area network (WAN).

As described above, according to the present embodiment, it is possible to build a data management system that can perform a bidirectional information exchange, i.e., an issuing of a command, using a primary storage unit 10 including a channel adapter having only a target function and a server (hierarchy management server 60) including a host bus adapter 61 having only an initiator function. With this data management system, it is possible to transmit a command to be executed in a disk-array control unit 20 having a target function to a server in real time, and execute the command for certain.

Furthermore, in a practical operation of the data management system, it becomes possible to perform a bidirectional data communication by simply changing a part of a function of a conventional primary storage unit 10 having only a target function. At the same time, when building an even larger-capacity data management system by combining a secondary storage unit 40 having a larger capacity than the primary storage unit 10 with the server (hierarchy management server 60), it is possible to effectively use existing resources. With this arrangement, a necessity of having the target function and the initiator function in both adapters in the disk-array control unit of the primary storage unit 10 and the hierarchy management server 60 to perform the bidirectional data communication can be eliminated. As a result, because only a change in a part of specification of the disk-array control unit having a target function takes a lower cost compared to a case of having the target function and the initiator function in both adapters, it is possible to lower a cost of implementing the data management system.

According to the present invention, even if there is a process that is desired to be executed in a disk array apparatus having a target function only, which only performs an execution of a command received, it is possible to transmit, for certain, a content of the process to an information processing apparatus having an initiator function that issues a command to execute the process. In this manner, it becomes practically possible to perform a bidirectional communication between the disk array apparatus and the information processing apparatus.

Furthermore, according to the present invention, when there is no request for a process to be executed at a time of receiving a status verifying message transmitted by polling from an information processing apparatus, even if the request is created before receiving a next status verifying message, it is possible to transmit the request immediately to the information processing apparatus.

Moreover, according to the present invention, it is possible to create a process to be executed in a disk array apparatus.

Furthermore, according to the present invention, even with a disk array apparatus having a target function only to receive and execute a command, it is possible to transmit a process to be executed by the disk array apparatus to an information processing apparatus as a request, thereby executing the process for certain.

Moreover, according to the present invention, it is possible to manage a request already notified and a request not notified yet, separately, and to manage a request executed from among the request already notified at the same time. Therefore, it is possible to eliminate a superfluous process to notify a request already notified again.

Furthermore, according to the present invention, when there is a process to be executed by a disk array apparatus, it is possible to transmit a content of the process to an information processing apparatus immediately to execute a corresponding command for certain without a delay.

Moreover, according to the present invention, when a request is not created, a response message is not returned until a time out is detected. Therefore, it is possible to suppress a load of polling process on an information processing apparatus. Besides, it is possible to notify a request that should be executed in real time to the information processing apparatus.

Furthermore, according to the present invention, it is possible to figure out a content of a process to be executed by a disk array apparatus having a target function only, and execute a process that is desired to be executed for the disk array apparatus for certain without a delay.

Moreover, according to the present invention, even with an existing primary storage unit having a target function only, it is possible to notify a process to be executed by the primary storage unit to a hierarchy management server as a request to cause the hierarchy management server having an initiator function to transmit a command corresponding to the request, thereby executing the process for certain without a delay. With this mechanism, it is possible to build a data management system that manages data in a plurality of storage units in a hierarchic manner by using an existing disk array apparatus having a target function only as a primary storage unit. In other words, it is possible to make a full use of the existing disk array apparatus.

Furthermore, according to the present invention, even with a disk array apparatus having a target function only to receive and execute a command, it is possible to transmit a process to be executed by the disk array apparatus to an information processing apparatus as a request, thereby executing the process for certain. Besides, even with an existing disk array apparatus having a target function only, it is possible to perform a substantially bidirectional communication by reading and executing a computer program according to the present invention in a magnetic disk device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of issuing a command from a target to an initiator in a system that includes an information processing apparatus that has a host bus adapter with only an initiator function to issue the command, and a disk array apparatus that has a channel adapter with only a target function to receive and execute the command, the information processing apparatus and the disk array apparatus being connected via a communication line, comprising:

polling including the information processing apparatus transmitting a status verifying message to the disk array apparatus to verify a status of the disk array apparatus;

preparing including the disk array apparatus preparing, upon receiving the status verifying message, a response message by attaching a request for a command of a process to be executed to the status verifying message;

transmitting including the disk array apparatus transmitting the response message to the information processing apparatus; and creating including the information processing apparatus creating a command based on the request attached to the response message; and transmitting including the information processing apparatus transmitting the command created to the disk array apparatus.

2. The method according to claim 1, further comprising:

determining, before the preparing, whether there is request for a command of a process to be executed at a time of receiving the status verifying message; and changing a state of the disk array apparatus to a standby status for a predetermined period of time when it is determined at the determining that there is no request, wherein the preparing includes the disk array apparatus preparing the response message by attaching a request that is created while the disk array apparatus is in the standby status to the status verifying message.

3. The method according to claim 1, further comprising creating including the disk array apparatus creating, when a process to be executed in the disk array apparatus occurs, a request to execute the process.

4. A disk array apparatus that is connected to an information processing apparatus including a host bus adapter with only an initiator function to issue a command, and includes a channel adapter with only a target function to receive and execute the command, comprising:
- a creating unit that creates, when a process to be executed occurs, a request to execute the process; and
- a processing unit that prepares a response message by attaching the request created to a response message to a status verifying message transmitted by polling from the information processing apparatus, and transmits the response message to the information processing apparatus.

5. The disk array apparatus according to claim 4, further comprising:
- an attached-request storing unit that stores the request attached to the response message; and
- a verifying unit that monitors a command from the information processing apparatus, and when the command is corresponding to the request stored in the attached-request storing unit, deletes the request from the attached-request storing unit.

6. The disk array apparatus according to claim 4, further comprising a created-request storing unit that stores the request created, wherein
- when a request is present in the created-request storing unit at a time of receiving the status verifying message, the processing unit prepares the response message by attaching the request present in the created-request storing unit and immediately transmits the response message to the information processing apparatus.

7. The disk array apparatus according to claim 6, wherein
- when no request is present in the created-request storing unit at a time of receiving the status verifying message, the processing unit enters a standby status for a predetermined period of time, the predetermine period time being shorter than a time from receiving the status verifying message until the information processing apparatus detects a time out,
- when a request is stored in the created-request storing unit during the predetermined period of time, the processing unit prepares the response message by attaching the request stored in the created-request storing unit and immediately transmits the response message to the information processing apparatus, and
- when no request is stored in the created-request storing unit during the predetermined period of time, the processing unit prepares, after the predetermined period of time has passed, a response message without attaching a request and transmits the response message to the information processing apparatus.

8. An information processing apparatus that is connected to a disk array apparatus including a channel adapter with only a target function to receive and execute a command, and includes a host bus adapter with only an initiator function to issue the command to the disk array apparatus, comprising:
- a polling unit that transmits a status verifying message to verify a status of the disk array apparatus to the disk array apparatus;
- a processing unit that creates, when a request to be executed by the disk array apparatus is attached to a response message from the disk array apparatus to the status verifying message, a command corresponding to the request; and
- a transmitting unit that transmits the command created to the disk array apparatus.

9. A data management system comprising:
- a primary storage unit including a disk array unit formed with a plurality of magnetic disk devices, a disk-array control unit that controls the disk array unit, and a channel adapter having only a target function to receive and execute a command, the primary storage unit being connected to a host computer, wherein the primary storage unit further includes
- a creating unit that creates, when a process to be executed occurs, a request to execute the process; and
- a first processing unit that prepares a response message by attaching the request created to a response message to a status verifying message transmitted from a hierarchy management server and transmits the response message to the hierarchy management server;
- a secondary storage unit having a larger capacity than the primary storage unit; and
- the hierarchy management server that includes a host bus adapter having only an initiator function to issue a command, and performs a hierarchy management of data by storing specific data selected, based on a predetermined standard, from among data stored in the secondary storage unit, the hierarchy management server being connected to the primary storage unit and the secondary storage unit, wherein the hierarchy management server further includes
- a polling unit that transmits the status verifying message to verify a status of the primary storage unit to the primary storage unit;
- a second processing unit that creates, when a request is attached to the response message, a command corresponding to the request; and
- a transmitting unit that transmits the command created to the primary storage unit.

10. The data management system according to claim 9, wherein the primary storage unit further includes
- a created-request storing unit that stores the request created;
- an attached-request storing unit that stores the request attached to the response message; and
- an verifying unit that monitors a command from the hierarchy management server, and when the command is corresponding to the request stored in the attached-request storing unit, deletes the request from the attached-request storing unit.

11. The data management system according to claim 10, wherein when a request is present in the created-request storing unit at a time of receiving the status verifying message, the first processing unit prepares the response message by attaching the request present in the created-request storing unit and immediately transmits the response message to the hierarchy management server.

12. The data management system according to claim 10, wherein
- when no request is present in the created-request storing unit at a time of receiving the status verifying message, the first processing unit enters a standby status for a predetermined period of time, the predetermine period time being shorter than a time from receiving the status verifying message until the hierarchy management server detects a time out, when a request is stored in the created-request storing unit during the predetermined period of time, the first processing unit prepares the response message by attaching the request stored in the created-request storing unit and immediately transmits the response message to the hierarchy management server, and when no request is stored in the created-request storing unit during the predetermined period of time, the first processing unit prepares, after the predetermined period of time has passed, a response message without attaching a request and transmits the response message to the hierarchy management server.

13. The data management system according to claim 9, wherein
the primary storage unit further includes
a stored-data-information storing unit that stores stored-data information that is a storing location, in the secondary storage unit, of data to be stored in the disk array unit; and
an address verifying unit that determines, based on the stored-data information, whether an access destination address included in the command received is the data to be stored in the disk array unit, and
when the address determining unit determines that the access destination address is not in the disk array unit, the request creating unit creates a request to extract data including the access destination address from the second storage unit, and to copy the data extracted to the disk array unit.

14. A computer-readable recording medium that stores therein a computer program for issuing a command in a channel adapter of a disk array apparatus that includes only a target function to receive and execute the command, the disk array apparatus being connected to an information processing apparatus including a host bus adapter having only an initiator function to issue the command, the computer program causing the channel adapter to execute:
creating, when a process to be executed occurs, a request to execute the process; and
preparing a response message by attaching the request created to a status verifying message that is transmitted by polling from the information processing apparatus; and
transmitting the response message created to the information processing apparatus.

15. The computer-readable recording medium according to claim 14, wherein the computer program further causing the channel adapter to execute:
storing the request attached to the response message in a attached-request storing unit of the disk array apparatus; and
monitoring the command from the information processing apparatus, and when the command is corresponding to the request stored in the attached-request storing unit, deleting the request from the attached-request storing unit.

16. The computer-readable recording medium according to claim 14, wherein the computer program further causing the channel adapter to execute:
storing the request created in a created-request storing unit of the disk array apparatus, and
the preparing includes preparing, when a request is present in the created-request storing unit at a time of receiving the status verifying message, the response message, and
the transmitting includes immediately transmitting the response message to the information processing apparatus.

17. The computer-readable recording medium according to claim 14, wherein the computer program further causing the channel adapter to execute:
storing the request created in a created-request storing unit of the disk array apparatus; and
entering, when no request is present in the created-request storing unit at a time of receiving the status verifying message, a standby status for a predetermined period of time, the predetermine period time being shorter than a time from receiving the status verifying message until the information processing apparatus detects a time out, wherein
when a request is stored in the created-request storing unit during the predetermined period of time, the preparing includes preparing the response message by attaching the request stored in the created-request storing unit to the status verifying message and the transmitting includes immediately transmitting the response message to the information processing apparatus, and
when no request is stored in the created-request storing unit during the predetermined period of time, the preparing includes, after the predetermined period of time has passed, preparing a response message without attaching a request to the status verifying message and the transmitting includes transmitting the response message to the information processing apparatus.

18. A computer-readable recording medium that stores therein a computer program for issuing a command to a disk array apparatus including a channel adapter with only a target function to receive and execute a command, and includes a host bus adapter with only an initiator function to issue the command to the disk array apparatus, the computer program causing the channel adapter to execute:
transmitting a status verifying message to verify a status of the disk array apparatus to the disk array apparatus;
creating, when a request to be executed by the disk array apparatus is attached to a response message from the disk array apparatus to the status verifying message, a command corresponding to the request; and
transmitting the command created to the disk array apparatus.

* * * * *